US011794881B2

(12) United States Patent
Rubin

(10) Patent No.: US 11,794,881 B2
(45) **Date of Patent: *Oct. 24, 2023**

(54) MARITIME VEHICLE WITH SURFACE ARRAY OF TRANSDUCERS CONTROLLING DRAG

(71) Applicant: United States of America, as represented by the Secretary of the Navy, San Diego, CA (US)

(72) Inventor: Stuart H. Rubin, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,128

(22) Filed: Aug. 2, 2022

(65) Prior Publication Data

US 2022/0371725 A1 Nov. 24, 2022

Related U.S. Application Data

(62) Division of application No. 16/898,061, filed on Jun. 10, 2020, now Pat. No. 11,453,482.

(51) Int. Cl.
*B63B 1/36* (2006.01)
*B64C 23/00* (2006.01)
*B63B 1/34* (2006.01)

(52) U.S. Cl.
CPC .............. *B64C 23/005* (2013.01); *B63B 1/34* (2013.01); *B63B 1/36* (2013.01)

(58) Field of Classification Search
CPC ......... B64C 23/00; B64C 23/005; B63B 1/34; B63B 1/36; B63B 2001/327
See application file for complete search history.

(56) References Cited

U.S. PATENT DOCUMENTS

| | | | | | |
|---|---|---|---|---|---|
| 3,492,634 | A | * | 1/1970 | Massa | G10K 11/004 367/173 |
| 4,363,991 | A | * | 12/1982 | Edelman | B64C 23/005 73/861.72 |
| 5,365,490 | A | * | 11/1994 | Katz | B64C 23/00 367/1 |

(Continued)

OTHER PUBLICATIONS

Liao, Wei-Qiang, et al. "A molecular perovskite solid solution with piezoelectricity stronger than lead zirconate titanate." Science 363. 6432 (2019): 1206-1210.

*Primary Examiner* — Richard Green
*Assistant Examiner* — Michael A. Fabula
(74) *Attorney, Agent, or Firm* — Naval Information Warfare Center, Pacific; Kyle Eppele; Matthew D. Pangallo

(57) ABSTRACT

A maritime vehicle includes a surface for contacting a fluid medium through which the maritime vehicle is propelled. The maritime vehicle also includes an array of transducers and a controller. The transducers in the array are arranged across the maritime vehicle's surface for generating pressure waves in the fluid medium. Each transducer in the array is arranged to vibrate for generating a respective pressure wave, which propagates away from the surface in the fluid medium. The controller vibrates the transducers in the array so that the pressure waves control the drag of the maritime vehicle from the fluid medium.

9 Claims, 5 Drawing Sheets

(56) References Cited

U.S. PATENT DOCUMENTS

| | | | | | |
|---|---|---|---|---|---|
| 5,803,409 | A * | 9/1998 | Keefe | B64C 23/005 | 244/206 |
| 5,901,928 | A * | 5/1999 | Raskob, Jr. | B64C 21/10 | 244/130 |
| 5,911,158 | A * | 6/1999 | Henderson | G01L 5/167 | 73/659 |
| 6,358,021 | B1 * | 3/2002 | Cabuz | B64C 3/38 | 310/309 |
| 6,644,598 | B2 * | 11/2003 | Glezer | F15D 1/12 | 244/200 |
| 6,664,716 | B2 * | 12/2003 | Cuhat | H10N 30/87 | 310/363 |
| 6,700,314 | B2 * | 3/2004 | Cuhat | H10N 30/87 | 310/334 |
| 6,722,581 | B2 * | 4/2004 | Saddoughi | B64C 23/06 | 239/524 |
| 6,793,177 | B2 * | 9/2004 | Bonutti | B63H 9/06 | 244/78.1 |
| 6,824,108 | B2 * | 11/2004 | Bonutti | F15D 1/12 | 244/130 |
| 7,210,983 | B1 * | 5/2007 | Chien | B24B 5/042 | 451/178 |
| 8,251,312 | B1 * | 8/2012 | Daso | B64C 21/04 | 244/130 |
| 8,955,325 | B1 * | 2/2015 | Rubin | F23K 5/22 | 60/737 |
| 10,502,246 | B2 * | 12/2019 | Amitay | F15D 1/12 | |
| 11,453,482 | B2 * | 9/2022 | Rubin | B63B 1/34 | |
| 2002/0125376 | A1 * | 9/2002 | Karniadakis | F15D 1/12 | 244/204 |
| 2002/0195526 | A1 * | 12/2002 | Barrett | B64C 23/005 | 244/208 |
| 2005/0157893 | A1 * | 7/2005 | Pelrine | B64C 3/48 | 381/190 |
| 2005/0207588 | A1 * | 9/2005 | Biegelsen | H04R 1/403 | 367/137 |
| 2007/0111643 | A1 * | 5/2007 | Chien | B24B 5/042 | 451/42 |
| 2017/0370387 | A1 * | 12/2017 | Nino | F15D 1/008 | |
| 2018/0023599 | A1 * | 1/2018 | Hussein | G10K 11/16 | 137/1 |
| 2018/0079492 | A1 * | 3/2018 | Seidel | B64D 15/163 | |
| 2019/0342985 | A1 * | 11/2019 | Dadheech | H05H 1/2439 | |
| 2022/0371725 | A1 * | 11/2022 | Rubin | B64C 23/04 | |

* cited by examiner

MARITIME VEHICLE WITH SURFACE ARRAY OF TRANSDUCERS CONTROLLING DRAG

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 211144.

BACKGROUND OF THE INVENTION

The majority of the energy needed to propel aircraft and maritime vessels is dissipated from the drag over the surfaces of these vehicles. This drag limits the speed and range of these vehicles, especially the range achievable during high-speed travel. For hypersonic aircraft, the drag produces dangerous frictional heating and shock waves resulting in troublesome sonic booms. There is a general need to improve the efficiency and operation of vehicles.

SUMMARY

A vehicle includes a surface for contacting a fluid medium through which the vehicle is propelled. The vehicle also includes an array of transducers and a controller. The transducers in the array are arranged across the vehicle's surface for generating pressure waves in the fluid medium. Each transducer in the array is arranged to vibrate for generating a respective pressure wave, which propagates away from the surface in the fluid medium. The controller vibrates the transducers in the array so that the pressure waves control the drag of the vehicle from the fluid medium.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1A:
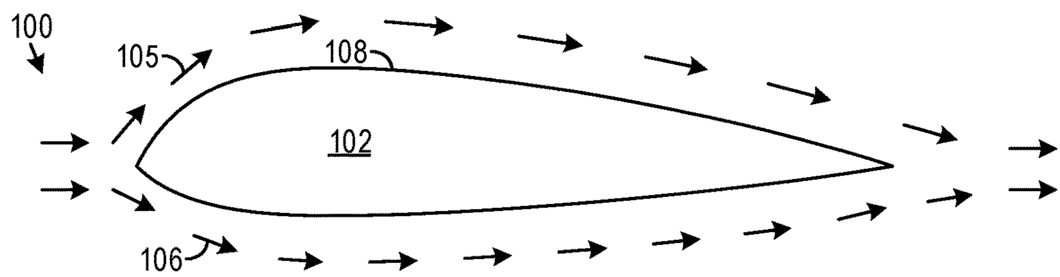
FIG. 1A and FIG. 1B are cross-sections of a wing of an aircraft in accordance with an embodiment of the invention, with FIG. 1A showing an unperturbed airflow, and FIG. 1B showing a displaced airflow perturbed by pressure waves emanating from an array of transducers.

FIG. 1A is a cross-section 100 of a wing 102 of an aircraft in accordance with an embodiment of the invention. FIG. 1A shows a laminar flow when the aircraft is propelled through the atmosphere at a subsonic speed, such as Mach 0.5. The airflow has an upper airflow 105 and a lower airflow 106. Because the shape of the wing 102 makes the upper airflow 105 travel farther than the lower airflow 106, the upper airflow 105 flows faster than the lower airflow 106, and this makes the pressure of the upper airflow 105 lower than the lower airflow 106. Thus, wing 102 generates lift.

In one embodiment, an array of transducers is arranged across the surface 108 of wing 102. FIG. 1A shows the unperturbed airflow of the atmosphere when the transducers are not vibrating.

Figure 1B:
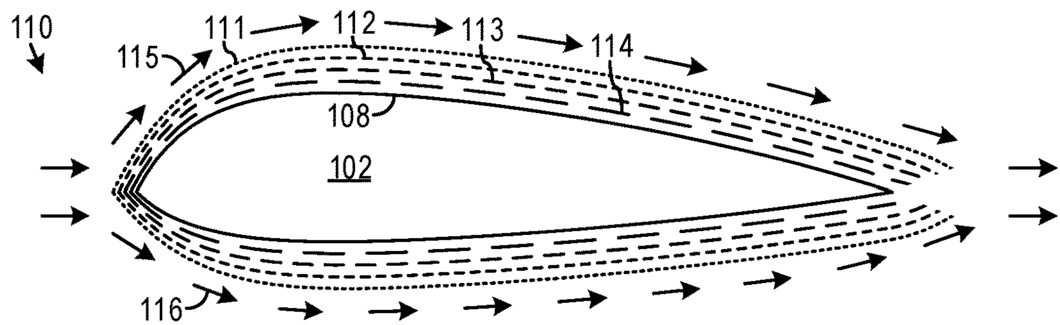

FIG. 1B is a cross-section 110 showing the perturbed airflow for the wing 102 of FIG. 1A when the transducers are vibrating to generate pressure waves 111, 112, 113, and 114 in the atmosphere. FIG. 1B shows the pressure waves 111, 112, 113, and 114 emanating from the transducers on surface 108 when the transducers are vibrating in synchronization with the same frequency and phase at the same amplitude. This generates a series of pressure waves 111, 112, 113, and 114 propagating away from the surface 108 in a direction locally perpendicular to surface 108. Pressure wave 111 was generated first from the transducers on surface 108 and has subsequently propagated the farthest from surface 108. Pressure wave 112 was generated next, and then pressure waves 113 and 114.

In the subsonic regime shown in FIGS. 1A and 1B, the transducers are typically vibrated to produce pressure waves 111, 112, 113, and 114 propagating away from surface 108 at the speed of sound, and the speed of sound is fairly constant around wing 102. Thus, the distance between successive pressure waves 111, 112, 113, and 114 is the speed of sound divided by the frequency of vibrating the transducers. However, the distance between successive pressure waves 111, 112, 113, and 114 is reduced at the leading edge of wing 102 as shown due to the Doppler effect. Although the pressure waves 111, 112, 113, and 114 at the leading edge of wing 102 propagate forward at the speed of sound, the wing 102 catches up at half the speed of sound when the aircraft is propelled at Mach 0.5.

The pressure waves 111, 112, 113, and 114 of FIG. 1B push the upper airflow 115 and the lower airflow 116 outward from the surface 108 of wing 102 as compared to the unperturbed airflows 105 and 106 of FIG. 1A. Thus, as the aircraft is propelled through the atmosphere, the transducers in the array vibrate so that the pressure waves 111, 112, 113, and 114 produce a displacement of the perturbed airflows 115 and 116 away from surface 108 as compared to the unperturbed airflows 105 and 106 without the pressure waves.

The pressure waves 111, 112, 113, and 114 effectively act as virtual extensions of the surface 108, but unlike surface 108, the pressure waves 111, 112, 113, and 114 are free to shift downstream as wing 102 is propelled upstream. Thus, the pressure waves 111, 112, 113, and 114 effectively act as pliable extensions of the surface 108.

The displacement of the perturbed airflows 115 and 116 as compared to the unperturbed airflows 105 and 106 produces several effects. As can be seen comparing FIGS. 1A and 1B, wing 102 is effectively made larger by the pressure waves 111, 112, 113, and 114, increasing the lift generated from wing 102. More importantly, the displacement increases the thickness of the boundary region of laminar flow between surface 108 and airflows 115 and 116. This is akin to reducing the viscosity of the atmosphere, and hence the displacement reduces the drag on the wing 102 from perturbed airflows 115 and 116 as compared to the unperturbed airflows 105 and 106. The reduced drag typically increases the speed of the perturbed airflows 115 and 116 as compared to the unperturbed airflows 105 and 106, and this further increases the lift generated from wing 102.

FIG. 1B shows the pressure waves 111, 112, 113, and 114 generated when the transducers are vibrating in synchronization with the same frequency and phase at the same amplitude. In general, each transducer in the array generates a respective pressure wave propagating away from surface 108 even when the transducers are not vibrating at the same frequency, phase, and amplitude. For example, when the transducers are vibrating with the same frequency and amplitude, but the phase ramps monotonically from upstream to downstream across surface 108, the combined effect creates a series of pressure waves propagating in a direction at an angle from the local normal to surface 108.

Figure 2A:
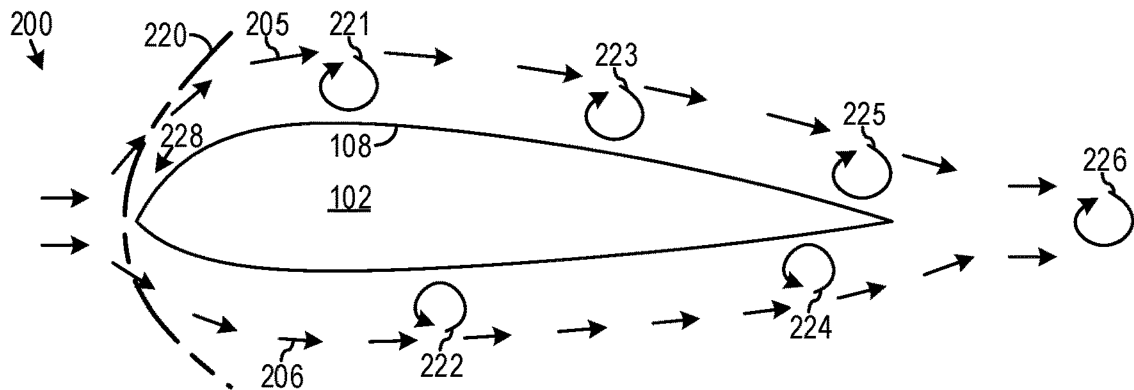
FIG. 2A and FIG. 2B are cross-sections of a wing of a hypersonic aircraft in accordance with an embodiment of the invention, with FIG. 2A showing an unperturbed airflow including a leading shockwave and eddies, and FIG. 2B showing an airflow perturbed by localized pressure waves to diminish the shockwave and cancel the eddies.

FIG. 2A is a cross-section 200 of a wing 102 of a hypersonic aircraft in accordance with an embodiment of the invention. FIG. 2A shows an unperturbed airflow including an upper airflow 205 and a lower airflow 206 when the aircraft of FIG. 1A-B is propelled through the atmosphere at a hypersonic speed, such as Mach 1.5, while the transducers are not vibrating. In the hypersonic regime, the leading edge of wing 102 induces a leading shockwave 220, and turbulent airflows 205 and 206 over surface 108 nominally produce eddies 221, 222, 223, 224, 225, and 226.

The shockwave 220 is shown detached from the leading edge of wing 102. Especially when the shockwave 220 is detached, pressure and temperature increase dramatically in the region 228 between the shockwave 220 and the leading edge of wing 102, drawing large amounts of energy from the aircraft's propulsion. Typically, the portion of airflows 205 and 206 in region 228 is subsonic even in the hypersonic regime, while the remainder of airflows 205 and 206 is hypersonic. The energy expended into region 228 not only dramatically increases drag, but also produces sonic booms and heating of wing 102.

The turbulent airflows 205 and 206 produce eddies 221, 222, 223, 224, 225, and 226 that consume additional energy to further increase drag.

Figure 2B:
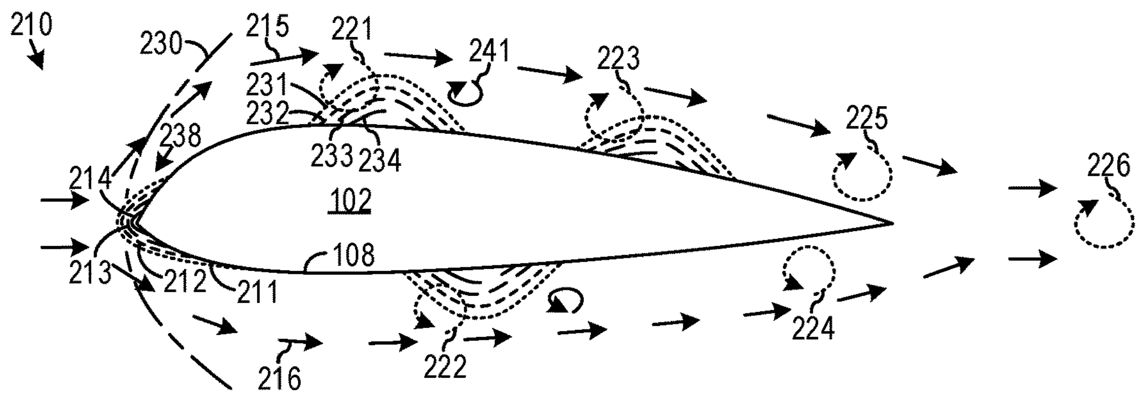

FIG. 2B is a cross-section 210 showing the perturbed airflow for the wing 102 of FIG. 2A when the transducers are vibrating to generate localized pressure waves that diminish the shockwave 220 and counteract or cancel the eddies 221, 222, 223, 224, 225, and 226 of FIG. 2A.

The localized pressure waves include pressure waves 211, 212, 213, and 214 emanating from surface 108 at the leading edge of wing 102. In the embodiment shown, the transducers vibrate with the same frequency, but with staggered phases, so the collectively generated pressure waves 211, 212, 213, and 214 propagate in directions at an angle from the local normal to the leading edge of surface 108. This pushes the airflows 215 and 216 away from the path of the wing 102, reducing drag.

The pressure waves 211, 212, 213, and 214 push into the typically subsonic airflow in region 238 between the shockwave 230 and the leading edge of wing 102. Because the maximum forward velocity of the vibrating transducers approximately adds to the airspeed of the leading edge of wing 102, the pressure waves 211, 212, 213, and 214 usually emanate from the leading edge at a hypersonic speed greater than the hypersonic airspeed of the aircraft. Thus, the pressure waves 211, 212, 213, and 214 overtake the shockwave 230, such that the shockwave 230 becomes effectively attached to the pliable extensions of the leading edge of surface 108 provided by pressure waves 211, 212, 213, and 214. This change from a detached shockwave 220 of FIG. 2A to the effectively attached shockwave 230 of FIG. 2B significantly reduces the pressure, temperature, and consumed energy of the region 238 of FIG. 2B as compared to the region 228 of FIG. 2A. Thus, the strength of shockwave 230 when the transducers are vibrating is significantly diminished from that of the shockwave 220 generated when the transducers are not vibrating. Therefore, the drag and the heating of wing 102 become significantly reduced.

The localized pressure waves further include pressure waves 231, 232, 233, and 234 emanating from a middle portion of surface 108 of wing 102. Because the airflows 215 and 216 flow approximately parallel to the middle portion of surface 108, the speed of pressure waves 231, 232, 233, and 234 in the direction away from surface 108 is approximately independent of the airspeed of the aircraft. Depending upon the maximum driving velocity of the vibrating transducers, the speed of pressure waves 231, 232, 233, and 234 away from surface 108 is either subsonic or hypersonic.

In one embodiment, sensors detect the position, movement, and strength of eddy 221 of FIG. 2A, and the transducers in the array vibrate in advance of the movement of the eddy 221 along the surface 108 such that the pressure waves 231, 232, 233, and 234 counteract and diminish the strength of the eddy 221 as shown with the dotted lines for eddy 221 in FIG. 2B. Because eddy 221 is captured between the downstream hypersonic airflow 215 and the upstream hypersonic movement of wing 102, and because random fluctuations initiate and amplify eddy 221, eddy 221 has a completely unpredictable position and somewhat unpredictable movement, but eddy 221 typically moves downstream and outward toward the wingtip (into the page of FIG. 2B).

The pressure waves 231, 232, 233, and 234 take time to propagate into eddy 221. Thus, the transducers in the array vibrate in advance of the movement of the eddy 221 so that the pressure waves 231, 232, 233, and 234 have time to propagate to a position within eddy 211 that is effective in counteracting eddy 211. In one embodiment, the pressure waves 231, 232, 233, and 234 counteract eddy 211 by pushing against the portion of the eddy 211 flowing inward toward surface 108.

In general, pressure waves from the transducers counteract all of the eddies 221, 222, 223, 224, 225, and 226. For an embodiment having a tight control loop between sensing and vibrating appropriate transducers, pressure waves from the transducers counteract all of the eddies 221, 222, 223, 224, 225, and 226, sufficiently to cancel these eddies, such that airflows 215 and 216 become laminar.

The pressure waves 231, 232, 233, and 234 might not be able to completely cancel eddy 221 due to the unpredictable behavior of eddies. Furthermore, the pressure waves 231, 232, 233, and 234 might initiate or enhance a secondary eddy 241. Although the local drag increases at the secondary eddy 241, generally the partially canceled eddy 221 reduces drag sufficiently so that the pressure waves 231, 232, 233, and 234 reduce the global drag between the wing 102 and the atmosphere. Furthermore, upon sensing induced eddy 241, the transducers later generate additional pressure waves that cancel eddy 241.

When the full dynamic range of the transducers is not needed to cancel eddies 221, 222, 223, 224, 225, and 226, the excess dynamic range supports superimposing additional pressure waves similar to the pressure waves 111, 112, 113, and 114 of FIG. 1B to push the perturbed airflows 215 and 216 of FIG. 2B outward from the surface 108 of wing 102 as compared to the unperturbed airflows 205 and 206 of FIG. 2A. This displacement further reduces drag and increases lift too as discussed above for FIG. 1B.

The pressure waves 111, 112, 113, and 114 of FIG. 1B and the pressure waves 211, 212, 213, 214, 231, 232, 233, and 234 of FIG. 2B reduce the drag of the hypersonic aircraft, reduce a frictional heating of the surface 108 of the wing of the hypersonic aircraft, and reduce a sonic boom generated from the hypersonic aircraft. These pressure waves increase an area over which airflows 115, 116, 215, and 216 over the surface 108 of the wing 102 are laminar, increase the lift from the wing 102 of the hypersonic aircraft from the airflows that are laminar, increase a flight ceiling of the hypersonic aircraft, and increase a maximum speed of the hypersonic aircraft.

Figure 3A:
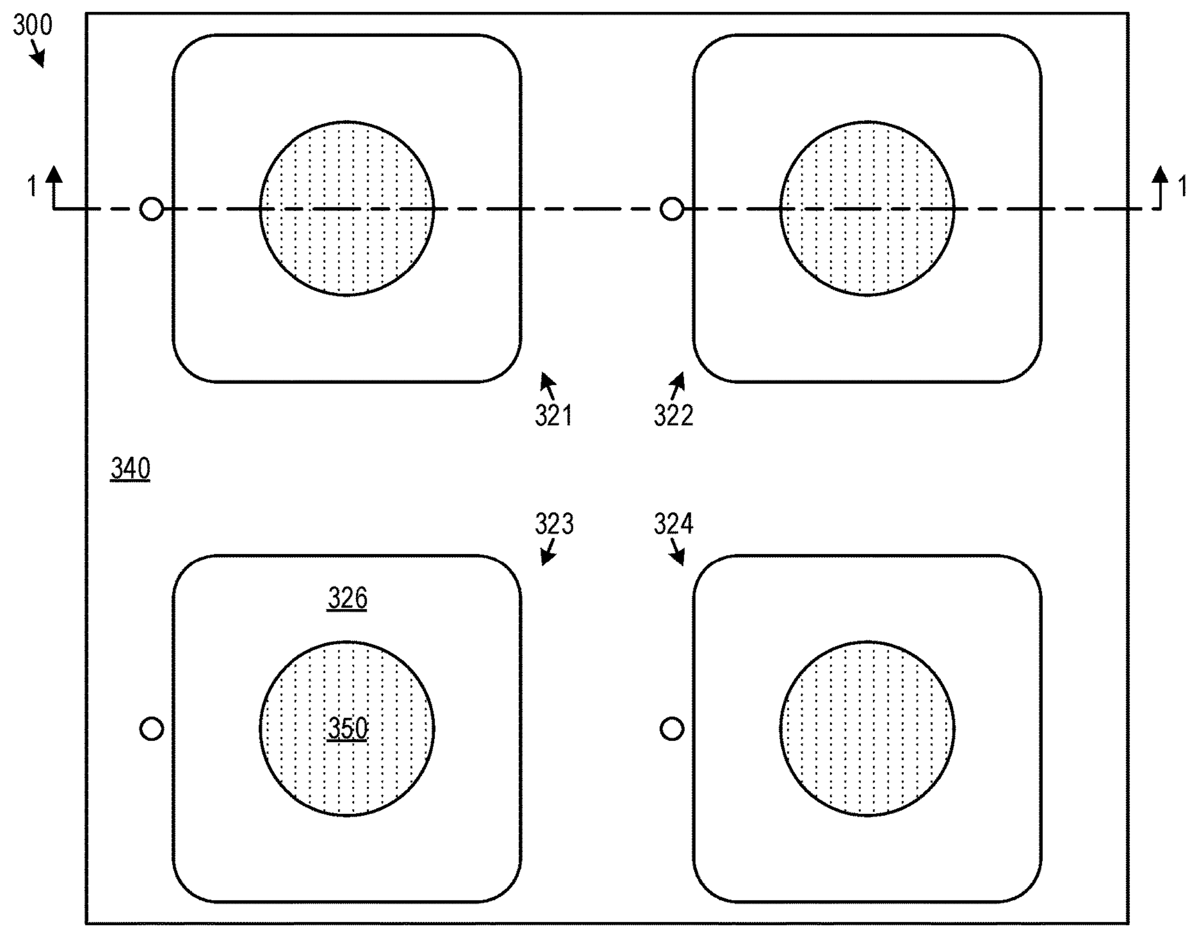
FIG. 3A and FIG. 3B are cross-sections at a surface of an aircraft showing an array of piezoelectric transducers coupling a flexible titanium skin with a rigid substructure in accordance with an embodiment of the invention.
Figure 3B:
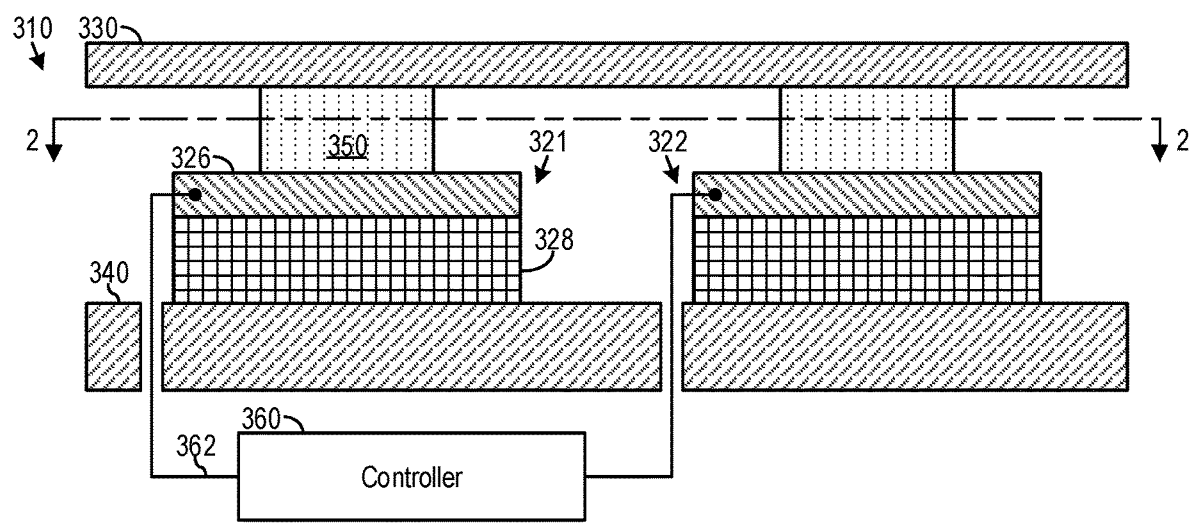

FIG. 3A and FIG. 3B are cross-sections 300 and 310 at a surface of an aircraft showing an array of piezoelectric transducers 321, 322, 323, and 324 coupling a flexible titanium skin 330 with a rigid substructure 340 in accordance with an embodiment of the invention. FIG. 3B is the cross-sectional view from section line 1-1 in FIG. 3A, and FIG. 3A is the cross-sectional view from section line 2-2 in FIG. 3B.

The piezoelectric transducers 321, 322, 323, and 324 vibrate the flexible titanium skin 330, which, in one embodiment, is surface 108 of aircraft wing 102 of FIG. 1A-B and FIG. 2A-B. It will be appreciated that other types of transducers, such as voice coil motors and magnetostrictive actuators, are arranged on surface 108 of wing 102 in other embodiments.

Piezoelectric transducer 321, for example, has a ground electrode provided by substructure 340 and a driven electrode 326 sandwiching piezoelectric material 328. Examples of piezoelectric material 328 include lead zirconate titanate, barium titanate, and molecular perovskite solid solution. Insulating connector 350 couples piezoelectric transducer 321 to flexible skin 330, which is composed of titanium in this embodiment because titanium does not exhibit metal fatigue.

To vibrate piezoelectric transducer 321, controller 360 applies a variable voltage on line 362 to driven electrode 326. Similarly, controller 360 dependently or independently drives piezoelectric transducers 322, 323, and 324. Controller 360 drives piezoelectric transducers 321, 322, 323, and 324 to generate pressure waves that control the drag of the aircraft when propelled through the atmosphere. Controller 360 vibrates piezoelectric transducers 321, 322, 323, and 324 to displace airflows over the surface of the aircraft as discussed above for FIG. 1A-B, and/or diminish shockwaves and counteract or cancel eddies as discussed above for FIG. 2A-B.

When the controller 360 drives piezoelectric transducer 321, the displacement of the piezoelectric transducer 321 is roughly proportional to the applied voltage on line 362. The velocity the flexible skin 330 driven by piezoelectric transducer 321 via connector 350 is roughly proportional to a derivative of the applied voltage on line 362. Therefore, when the controller 360 applies a sinusoidal voltage to piezoelectric transducer 321, the maximum driven velocity of the flexible skin 330 is proportional to a product of the amplitude of the sinusoidal voltage and the frequency of the sinusoidal voltage. Thus, the maximum driven velocity occurs at the upper end of the frequency response of piezoelectric transducer 321. This maximum driven velocity is greater than the speed of sound in one embodiment, such that piezoelectric transducer 321 generates hypersonic pressure waves propagating away from flexible skin 330. It will be appreciated that controller 360 applies another variable voltage in another embodiment, such as a saw-tooth voltage having a fast rise to achieve a high-speed pressure waves and a relatively slow fall to extend the spacing between the high-speed pressure waves. In practice, the leading and trailing edges will be somewhat sinusoidal due to mechanical inertial and parasitic electrical capacitance.

In one embodiment, piezoelectric transducers 321, 322, 323, and 324 serve a dual role of both generating the pressure waves and measuring the strength of the eddies. Deformation of piezoelectric transducer 321, for example, due to the pressure from an eddy induces a voltage on line 362 corresponding to an amount of the deformation. Controller 360 determines the strength of any eddy at the position of piezoelectric transducer 321 from the induced voltage on line 362. The controller 360 is adapted to vibrate piezoelectric transducers 321, 322, 323, and 324 in response to the position and strength of the eddies as measured by the transducers 321, 322, 323, and 324.

Figure 4:
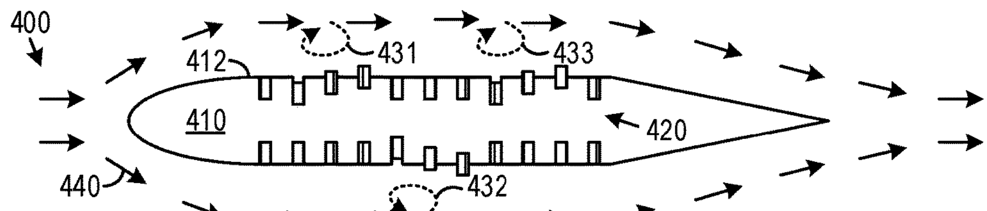
FIG. 4 is a cross-section of a maritime vehicle showing pistons driven out of the hull of the maritime vehicle and into the seawater for cancelling eddies in accordance with an embodiment of the invention.

FIG. 4 is a cross-section 400 of a maritime vehicle 410 showing pistons 420 driven out of the hull of the maritime vehicle 410 and into a body of water, such as seawater, for cancelling eddies 431, 432, and 433 in accordance with an embodiment of the invention. The maritime vehicle 410 is a ship, a submarine, or a torpedo.

The maritime vehicle 410 is designed to be propelled through seawater while the pistons 420 and the surface 412 of the hull of the maritime vehicle 410 contact the seawater. The pistons 420 are arranged in an array across the surface 412 for generating pressure waves (not shown) in the seawater. Each of the pistons 420 is arranged to vibrate for generating a respective pressure wave propagating away from the surface 412 in the seawater. The pistons 420 vibrate so that the pressure waves control a drag of the maritime vehicle 410 from the flow 440 of the seawater arising when the maritime vehicle 410 is propelled through the seawater.

The pistons 420 vibrate to reduce the drag from water contacting the maritime vehicle 410 of FIG. 4 in a manner similar to the transducers vibrating to reduce the drag from the atmosphere contacting the surface 108 of the aircraft of FIG. 2A-B. A principal difference is that the vibrating frequency is typically 6 to 13 Hz for the maritime vehicle 410 and typically 10 to 50 kHz for the aircraft.

Figure 5A:
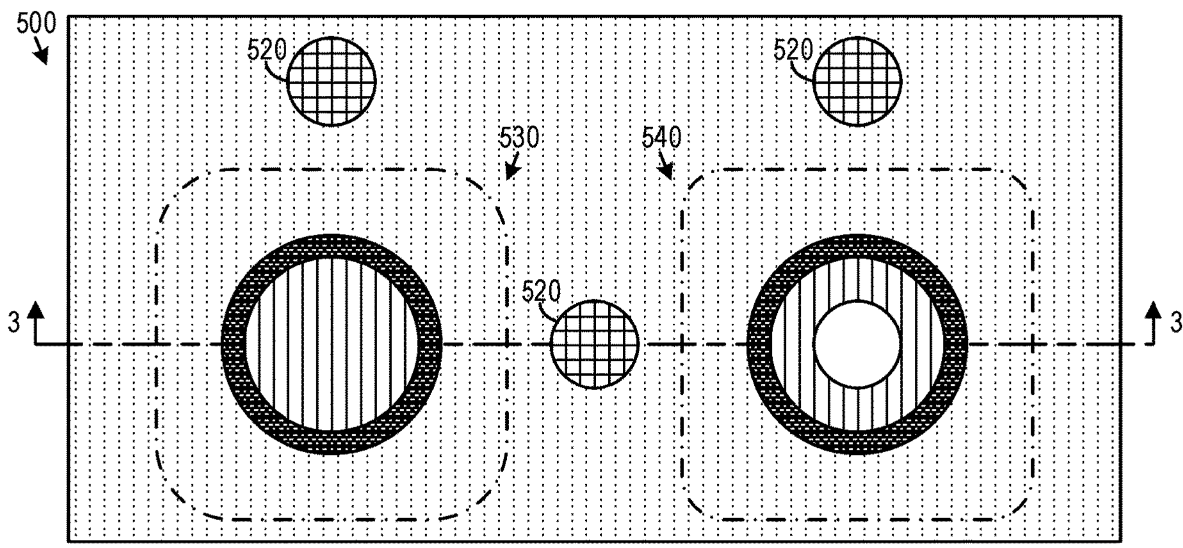
FIG. 5A and FIG. 5B are cross-sections of a hull of a maritime vehicle showing sensors and an array of solenoids or voice coil motors for driving pistons out of the hull into the seawater in accordance with an embodiment of the invention.
Figure 5B:
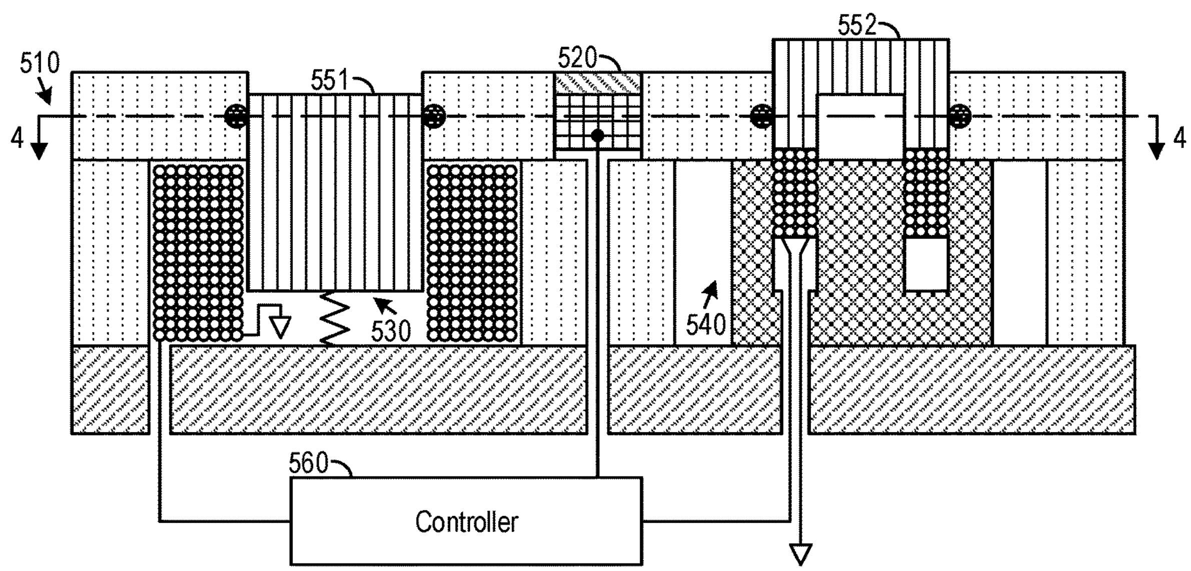

FIG. 5A and FIG. 5B are cross-sections 500 and 510 of a hull of a maritime vehicle showing sensors 520 and an array of transducers, such as solenoid 530 or voice coil motor 540, for driving pistons 551 and 552 out of the hull into the seawater and back in accordance with an embodiment of the invention. FIG. 5B is the cross-sectional view from section line 3-3 in FIG. 5A, and FIG. 5A is the cross-sectional view from section line 4-4 in FIG. 5B.

In one embodiment, the pistons 551 and 552 of FIG. 5A-B are the pistons 420 of FIG. 4. It will be appreciated that the array of transducers are usually all solenoids or all voice coil motors.

The sensors 520 arranged across the surface of the hull. The controller 560 is adapted to vibrate solenoid 530 and/or voice coil motor 540 to generate pressure waves that reduce drag in response to the strength of the eddies as measured by the sensors 520. The controller 560 is adapted to vibrate solenoid 530 and/or voice coil motor 540 in advance of a movement of the eddies such that the pressure waves counteract the eddies, thereby diminishing a strength of the eddies and reducing the drag. Preferably, the pressure waves counteract the eddies sufficiently to cancel the eddies, such that the flow becomes laminar.

In another embodiment, sensors 520 are omitted because voice coil motor 540 has a dual role of both generating the pressure waves and acting as a microphone that measures the strength of any eddy at the position of the voice coil motor 540.

Figure 6:
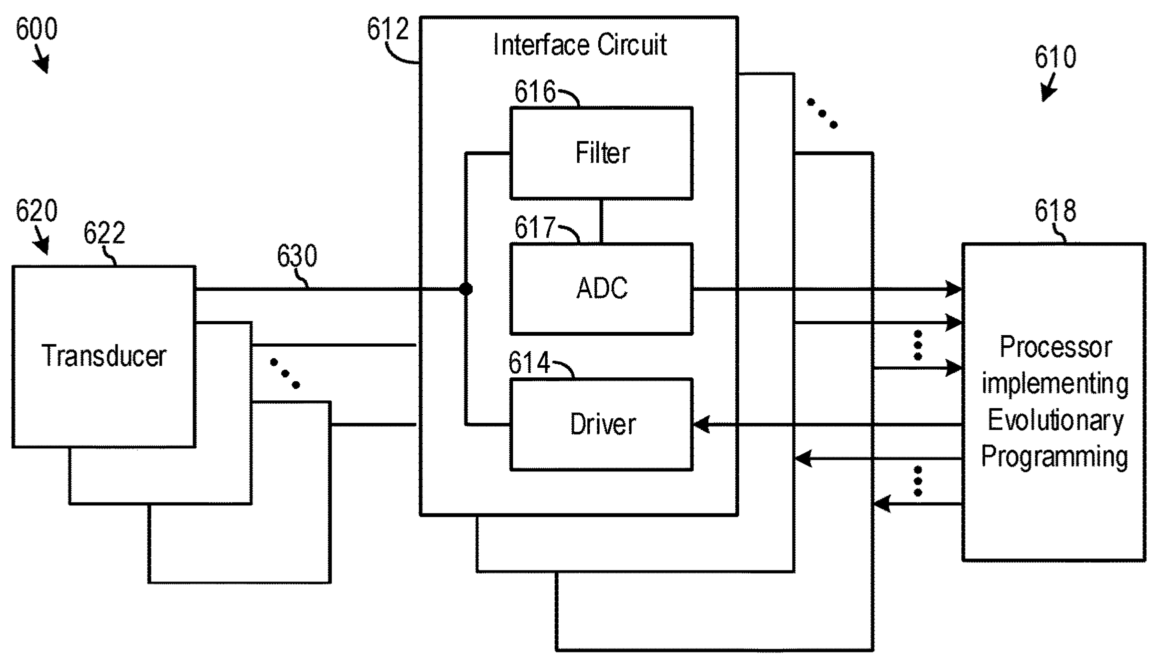
FIG. 6 is a block diagram of a controller for vibrating an array of transducers to produce pressure waves that control the drag of a propelled vehicle in accordance with an embodiment of the invention.

FIG. 6 is a block diagram 600 of a controller 610 for vibrating an array 620 of transducers to produce pressure waves that control the drag of a propelled vehicle in accordance with an embodiment of the invention. Each transducer in the array 620 has a dual role of both generating the respective pressure wave and measuring the strength of any eddy at the position of the transducer.

The controller 610 drives electrical signals for vibrating the transducers, such as electrical signal on line 630 for vibrating transducer 622. The controller 610 is adapted to coordinate driving the electrical signals for the transducer array 620 to generate pressure waves that counteract the eddies, or that completely cancel the eddies to establish and maintain a laminar flow over a surface of the vehicle.

In this embodiment, each transducer in the array 620 has a respective interface circuit within controller 610. For example, transducer 622 has respective interface circuit 612. Driver 614 of interface circuit 612 drives the electrical signal on line 630 to vibrate transducer 622 within a first band of driven frequencies. Because any eddy at transducer 622 induces feedback on the electrical signal on line 630, the electrical signal on line 630 is a superposition of the driven signal from driver 614 and the feedback signal from transducer 622. Thus, the composite electrical signal on line 630 resembles a carrier wave with the feedback signal modulating the driven signal. The driver signal is known. Thus, the driven signal is effectively subtracted from the unknown feedback signal to leave the latter for analysis and corresponding induced corrective action in one embodiment.

Filter 616 of interface circuit 612 of controller 610 substantially isolates the feedback signal from the composite electrical signal on line 630. Filter 616 separates a second band of induced frequencies of the feedback from the first band of driven frequencies. In one embodiment, driver 614 drives an oscillating electrical signal on line 630 that oscillates transducer 622 within the first band of driven frequencies, which are higher frequencies than the second band of induced frequencies of the feedback from the eddies, such that filter 616 is a low-pass filter. Analog-to-digital converter 617 converts the analog isolated feedback signal into a digital representation for processor 618.

Controller 610 is adapted to vibrate the transducers in the array 620 in response to the strength of the eddies as measured by the transducers. The controller 610 is adapted to oscillate the transducers in the array 620 within the first band of driven frequencies in response to the strength of the eddies determined from the second band of induced frequencies of the feedback. However, this bijective correspondence is usually only temporary. Non-linear feedback from local oscillations requires that compensatory oscillations be predictive to have the desired effect. That is why the standard technique of evolutionary programming is used to predictively correct oscillations. In practice, the dampening effect is learned, reused, and adapted to maximally and predictively cancel out dynamic eddy formations (i.e., without inducing other, possibly stronger, eddies to form).

Controller 610 further includes a processor 618. In one embodiment, processor 618 is a graphical processing unit (GPU) including a large number of individual processors originally designed for image processing. GPU processor 618 has a sufficiently large number of individual processors to allocate one individual processor for each transducer in the array 620. This dedicated processor for each transducer enables a tight control loop between sensing and vibrating the transducers, which is especially needed in aerospace applications. This technique is used to eliminate round off error in fluid mechanics, where difference equations are substituted for differential equations and one processor is assigned to each cubic unit of the mesh.

Processor 618 of controller 610 is adapted to implement evolutionary programming that determines a frequency and an amplitude and a phase for the frequency of oscillating each of the transducers in the array 620 so that the pressure waves generated by the transducers cancel the eddies, such that the flow of the fluid medium over a surface of the vehicle becomes laminar. The evolutionary programming includes a set of mappings between sensing an eddy at a particular transducer in the array 620 and which of the usually nearby and downstream transducers in the array to oscillate at a frequency with an amplitude and phase. Each mapping is continually mutated with changes to the oscillating frequency, amplitude, and phase. The evolutionary programming retains a mutation when the mutation improves suppression of the sensed eddy; otherwise, the mutation is discarded.

Efficiency of the evolutionary programming improves when the mappings capture patterns. For example, when a transducer in array 620 having coordinates (x, y) senses an eddy with strength a for the induced voltage, the mapping pattern specifies vibrating the transducer at (x+2, y) at frequency f and phase 0 with amplitude 100a for the driving voltage and vibrating each of the transducers at (x+3, y−1), (x+3, y), (x+3, y+1), (x+3, y+2) at frequency f and phase $\pi/4$ with amplitude 50 a and the projected period comprises the denominator. This mapping captures the pattern that the sensed eddy is currently expected to move primarily downstream in the x direction and slightly in they direction, and hence vibrates the transducers in advance of the currently expected movement of the sensed eddy. The evolutionary programming mutates the various parameters of the mapping pattern and retains mutations subsequently found to improve suppression of the sensed eddy. This adapts to changing conditions that change the movement of the eddies and/or change the propagation of the pressure waves.

Figure 7:
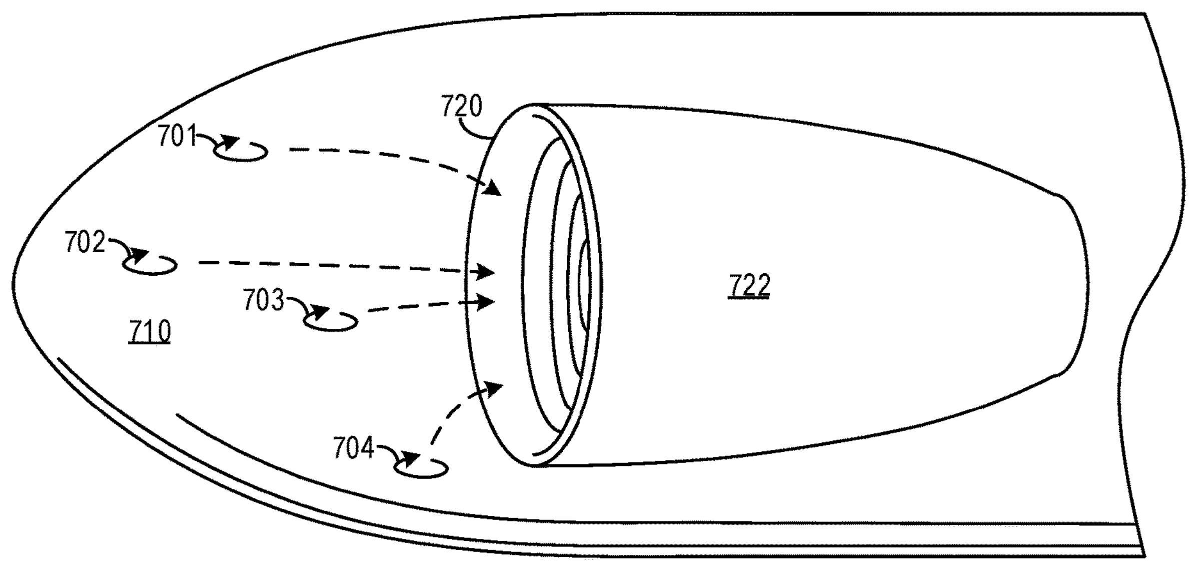
FIG. 7 is a perspective diagram showing steering of eddies from a fuselage of an aircraft into an intake of a jet engine for propelling the aircraft in accordance with an embodiment of the invention.

FIG. 7 is a perspective diagram 700 showing steering of eddies 701, 702, 703, and 704 from a fuselage 710 of an aircraft into an intake 720 of a jet engine 722 for propelling an aircraft in accordance with an embodiment of the invention. For clarity, a wing of the aircraft is omitted from FIG. 7.

Airflow over the surface of fuselage 710 produces eddies 701, 702, 703, and 704 when the jet engine 722 propels the aircraft through the atmosphere. A controller vibrates transducers arranged in an array on the surface of the fuselage 710. The transducers vibrate to produce pressure waves that steer the eddies 701, 702, 703, and 704 into the intake 720 of jet engine 722. Here, the eddies serve to better mix the fuel and air—resulting in a more complete burn for increased efficiency. The strength of each eddy 701, 702, 703, or 704 increases, decreases, or remains the same during steering into the intake 720 of jet engine 722. If the strength of the eddies 701, 702, 703, and 704 increases, then drag increases correspondingly; however, the energy within the eddies 701, 702, 703, and 704 is usually recovered in increased thrust from jet engine 722. In one embodiment, the strength of the eddies 701, 702, 703, and 704 is preferably increased during steering to produce turbulence that improves fuel/air mixing within jet engine 722 resulting in higher combustion efficiency and further increased thrust from jet engine 722.

Figure 8:
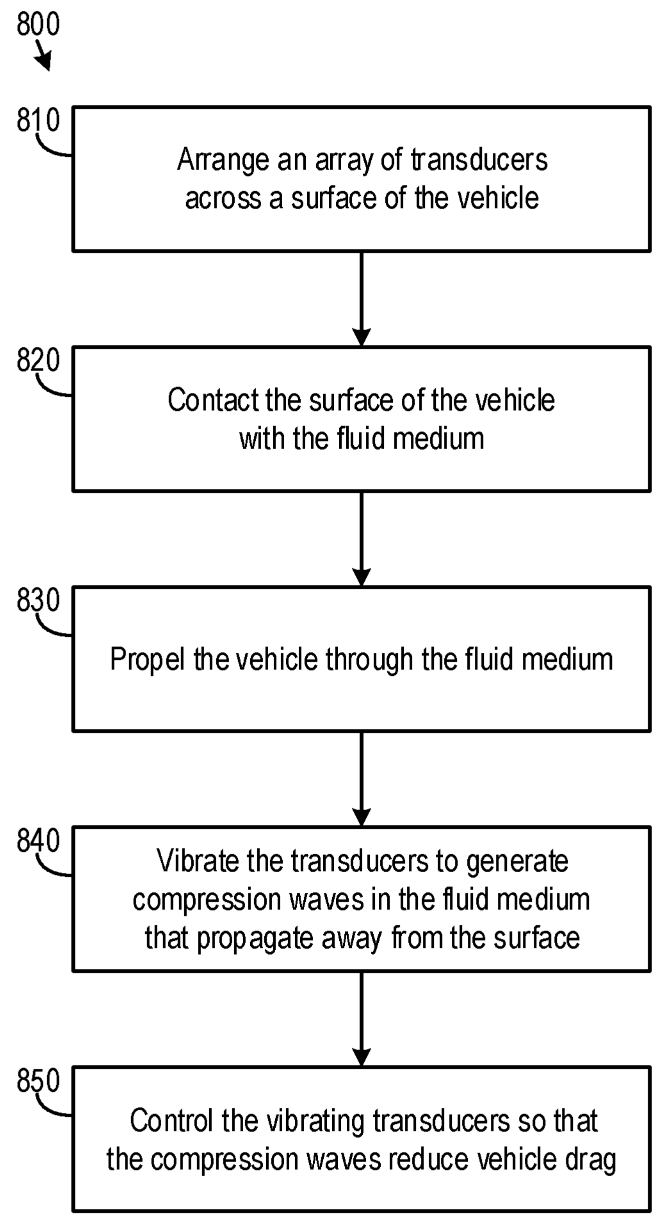
FIG. 8 is a flow diagram of a process of controlling a drag on a vehicle from a fluid medium in accordance with an embodiment of the invention.

FIG. 8 is a flow diagram of a process 800 of controlling a drag on a vehicle from a fluid medium in accordance with an embodiment of the invention.

At step 810, an array of transducers is arranged across a surface of the vehicle. At step 820, the surface of the vehicle is contacted with the fluid medium. At step 830, the vehicle is propelled in movement through the fluid medium.

At step 840, the transducers in the array are vibrated to generate pressure waves in the fluid medium. Each of the transducers in the array generates a respective one of the pressure waves. The respective pressure wave propagates away from the vehicle's surface in the fluid medium. At step 850, the vibrating transducers are controlled so that the pressure waves reduce the drag between the vehicle and the fluid medium during the movement.

I claim:

1. A maritime vehicle designed to be propelled through a fluid medium comprising:

a surface of the maritime vehicle, the surface for contacting the fluid medium, wherein the surface is a hull of the maritime vehicle that contacts the fluid medium and when the maritime vehicle is propelled through the fluid medium, a flow of the fluid medium over the hull produces a plurality of eddies in the fluid medium;

an array of transducers arranged across the hull for generating a plurality of pressure waves in the fluid medium, each of the transducers in the array arranged to vibrate for generating a respective pressure wave of the plurality, the respective pressure wave propagating away from the hull in the fluid medium, wherein the transducers in the array are a plurality of voice coil motors or a plurality of solenoids for coordinating driving of a plurality of respective pistons out of the hull into the fluid medium and back; and a controller configured to vibrate those of the transducers that are disposed on the hull in advance of a movement along the hull of at least one sensed eddy of the eddies so that the pressure waves from the respective pistons reduce a drag of the maritime vehicle from the fluid medium when the maritime vehicle is propelled through the fluid medium, wherein:

the controller is adapted to vibrate those of the transducers that are disposed on the hull in advance of the movement of the sensed eddy along the hull such that the pressure waves from the transducers counteract the sensed eddy, thereby diminishing a strength of the eddies and reducing the drag on the maritime vehicle from the fluid medium;

the transducers are for a dual role of both generating the pressure waves and measuring the strength of the eddies;

the controller is adapted to vibrate the transducers in the array in response to a pattern of the movement and the strength of each of the at least one sensed eddy of the eddies as measured by the transducers;

the controller is adapted to coordinate driving a plurality of respective electrical signals for the transducers for generating the pressure waves within a first band of driven frequencies for canceling the eddies and maintaining the flow that is laminar over the hull of the maritime vehicle;

the transducers serve in the dual role including measuring the strength of the eddies because the strength of the eddies induces corresponding feedback on the respective electrical signal for each of the transducers;

the controller includes a respective filter for each of the transducers, the respective filter separating, from the respective electrical signal, a second band of induced frequencies of the feedback from the first band of driven frequencies; and the controller is adapted to oscillate the transducers in the array within the first band of driven frequencies in response to the strength of the eddies determined from the second band of induced frequencies of the feedback.

2. The maritime vehicle of claim 1, wherein the controller is configured to vibrate the transducers in the array so that the pressure waves reduce the drag when the maritime vehicle is propelled through the fluid medium.

3. The maritime vehicle of claim 1, wherein the controller is configured to vibrate the transducers in the array so that the pressure waves reduce the drag that is a global drag between the maritime vehicle and the fluid medium, while increasing a local drag between a portion of the hull of the maritime vehicle and the fluid medium.

4. The maritime vehicle of claim 1, wherein when the maritime vehicle is propelled through the fluid medium, the controller is configured to vibrate the transducers in the array so that the pressure waves produce a displacement from the hull of a perturbed flow of the fluid medium as compared to an unperturbed flow of the fluid medium over the hull without the pressure waves, and the displacement assists reducing the drag on the maritime vehicle from the fluid medium.

5. The maritime vehicle of claim 1, wherein the pressure waves from the transducers counteract the eddies sufficiently to cancel the eddies, such that the flow of the fluid medium over the hull of the maritime vehicle becomes laminar.

6. The maritime vehicle of claim 1, wherein the controller includes at least one processor programmed to implement evolutionary programming that determines a frequency and an amplitude and a phase for the frequency of oscillating each of the transducers in the array so that the pressure waves generated by the transducers cancel the eddies, such that the flow of the fluid medium over the hull of the maritime vehicle becomes laminar.

7. The maritime vehicle of claim 1, further comprising a plurality of sensors arranged across the hull of the maritime vehicle, wherein the controller is configured to vibrate the transducers in the array in response to a pattern of the movement and the strength of each of said at least one sensed eddy as measured by the sensors.

8. The maritime vehicle of claim 1, wherein the maritime vehicle is one of a ship, a submarine, or a torpedo, the fluid medium is seawater, and the first band of driven frequencies is 6 to 13 Hz.

9. The maritime vehicle of claim 1, wherein the controller is adapted to vibrate the transducers in the array so that the pressure waves steer the eddies.

* * * * *